United States Patent [19]

Robbins

[11] Patent Number: 5,107,637

[45] Date of Patent: Apr. 28, 1992

[54] TRANSIT SHELTER WITH SELF-CONTAINED ILLUMINATION SYSTEM

[75] Inventor: Steven Robbins, Miami, Fla.

[73] Assignee: B & E Energy Systems Inc., Bloomfield Hills, Mich.

[21] Appl. No.: 564,779

[22] Filed: Aug. 9, 1990

[51] Int. Cl.5 .......................... F21S 1/02; G09F 13/00
[52] U.S. Cl. ........................................ 52/28; 40/442; 40/605; 362/183; 362/145
[58] Field of Search ...................... 52/27, 28; 362/145, 362/147, 144, 183; 40/442, 605

[56] References Cited

U.S. PATENT DOCUMENTS

| 4,384,317 | 5/1983 | Stackpole | 362/183 |
| 4,410,930 | 10/1983 | Yachabach | 52/27 |
| 4,718,185 | 1/1988 | Conlin | 362/183 |
| 4,754,582 | 7/1988 | Cameron | 52/38 |

Primary Examiner—John E. Murtagh
Attorney, Agent, or Firm—Krass and Young

[57] ABSTRACT

A shelter structure includes a photovoltaic illumination system. A pair of translucent, spaced-apart panels define an interior volume which houses and protects the lamps, batteries and illumination circuitry of the system.

7 Claims, 3 Drawing Sheets

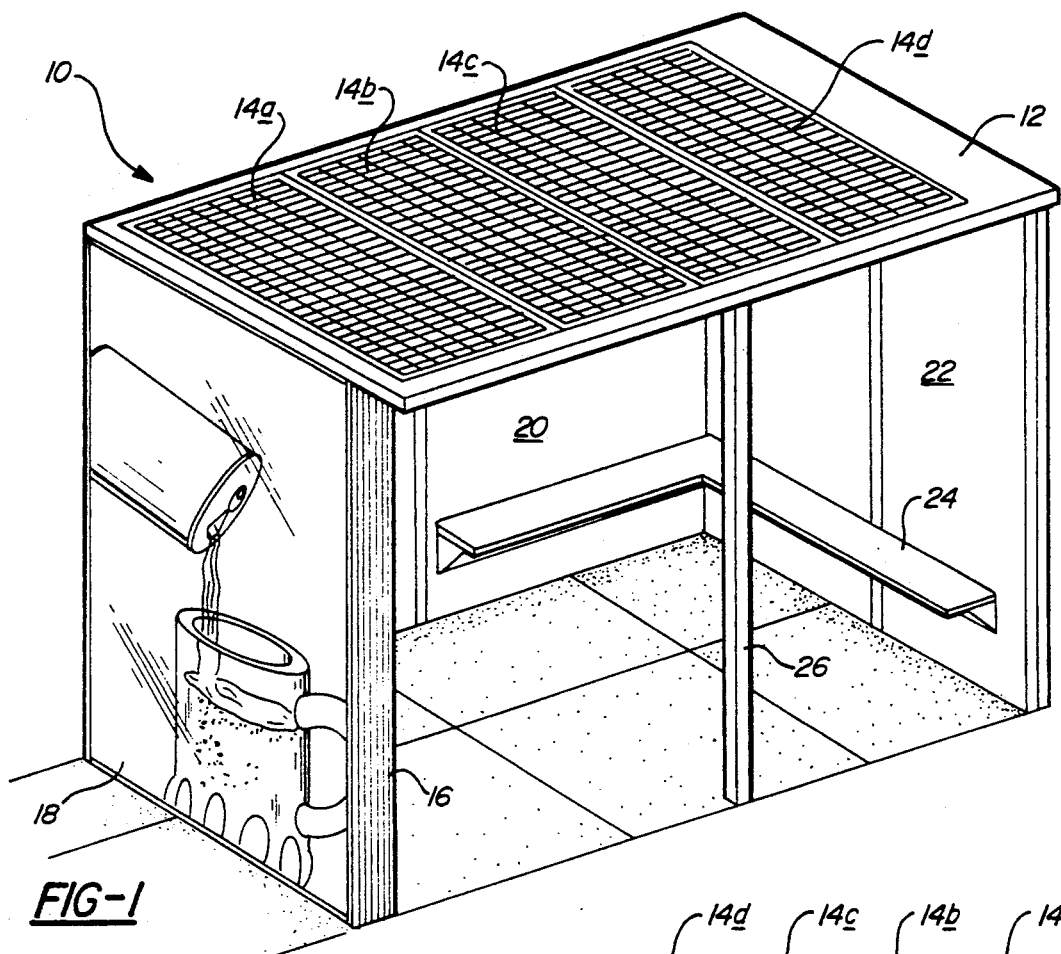
FIG-1
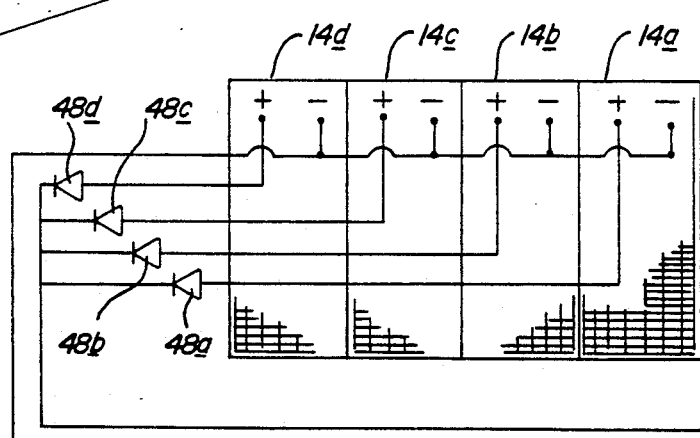
FIG-4
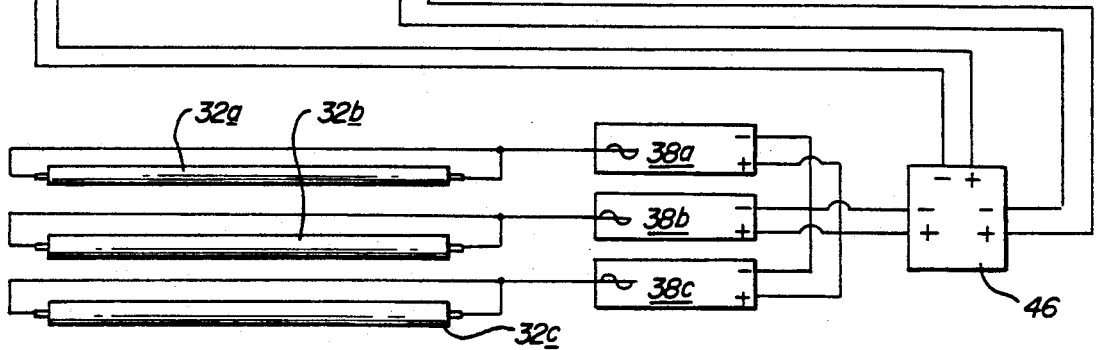

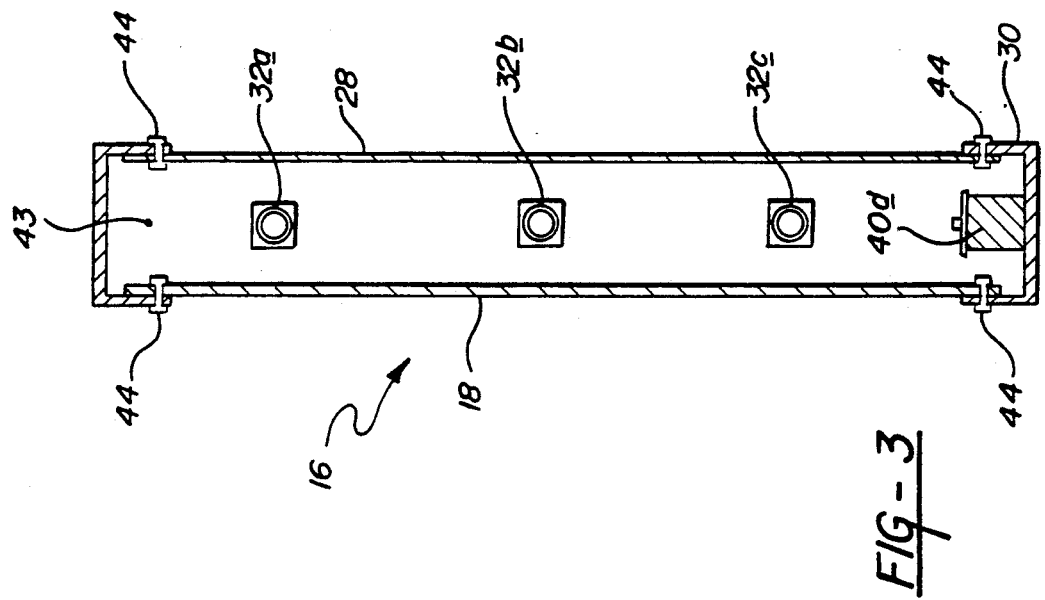
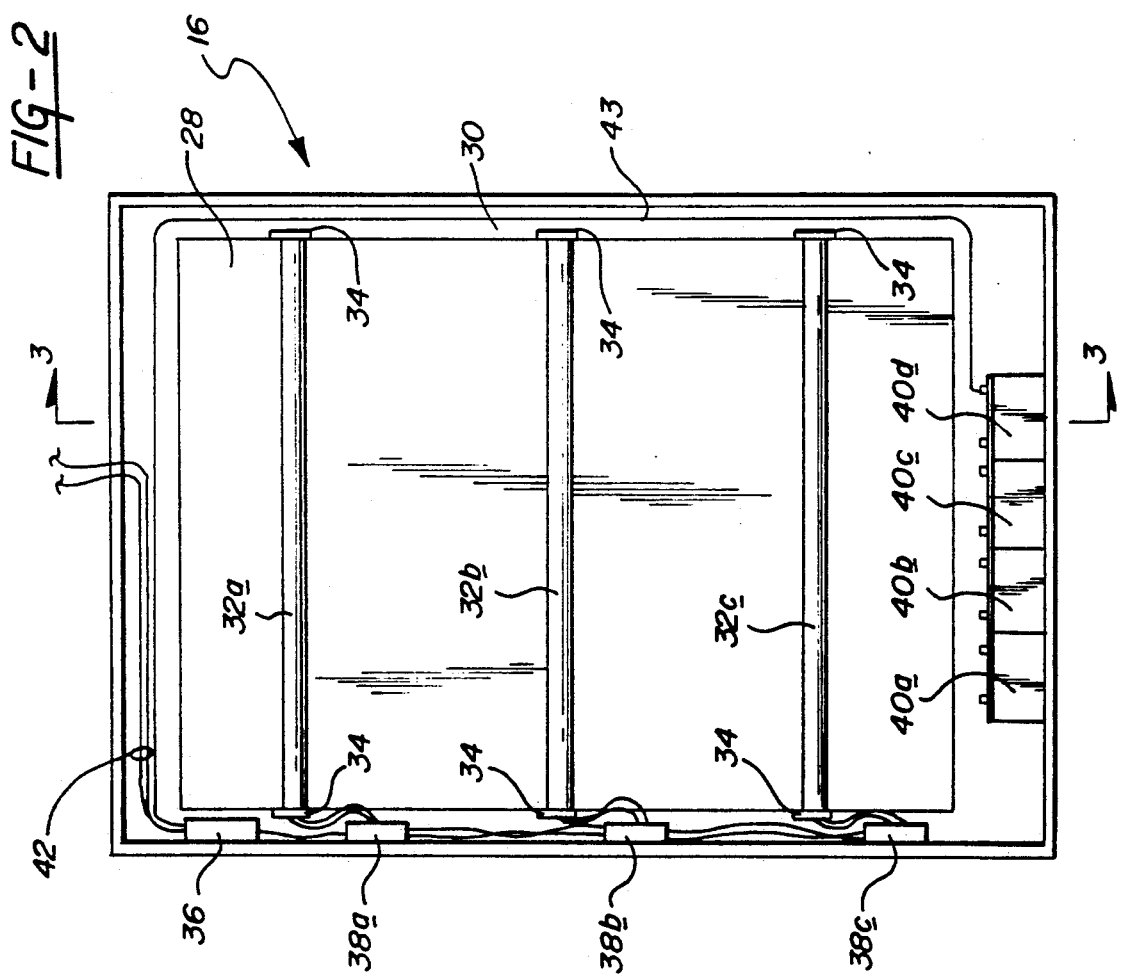

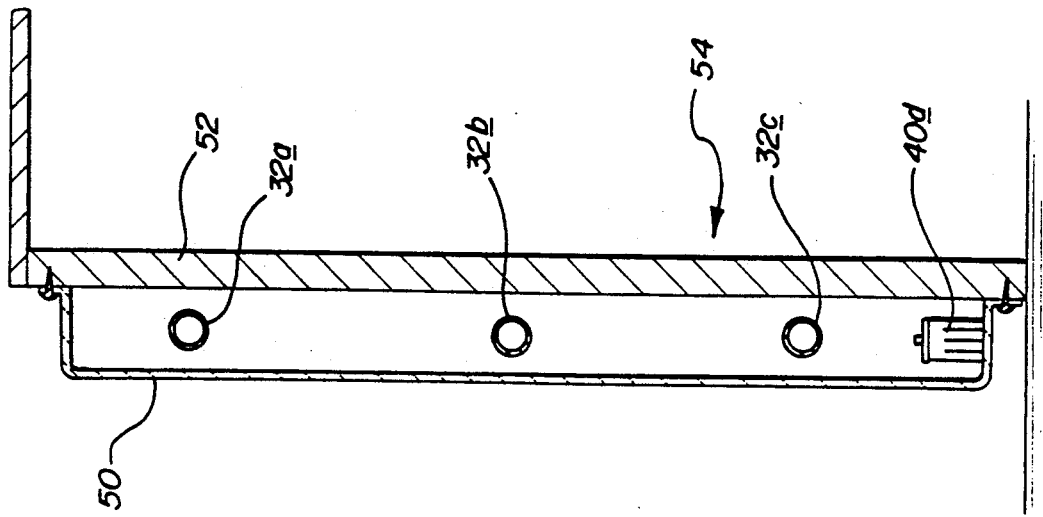
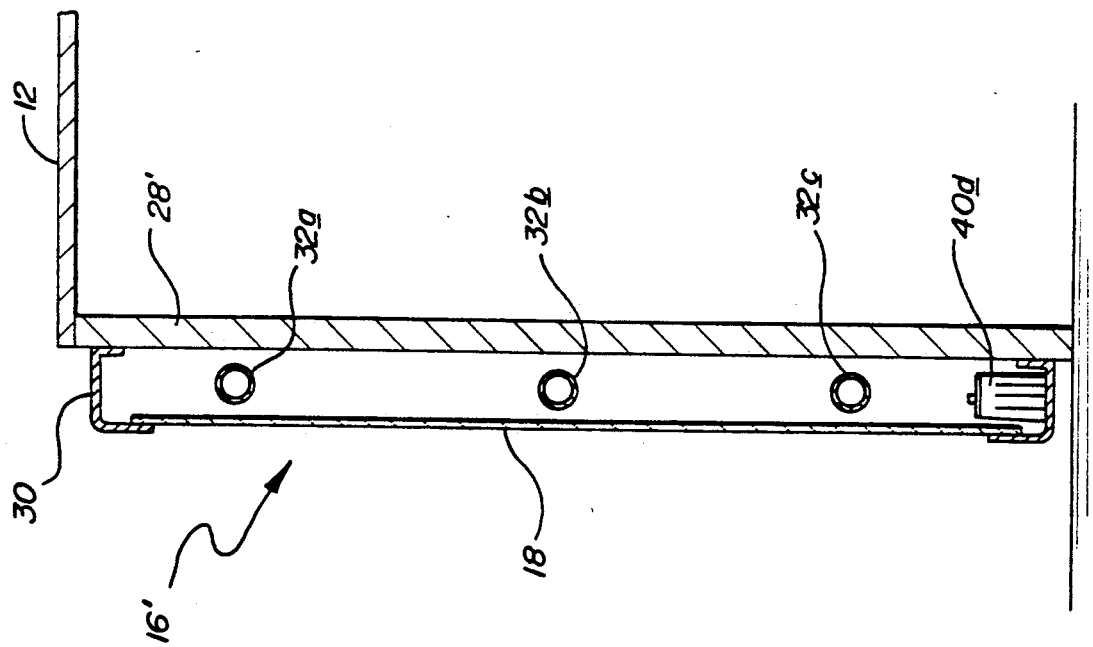

TRANSIT SHELTER WITH SELF-CONTAINED ILLUMINATION SYSTEM

FIELD OF THE INVENTION

This invention relates generally to shelter structures and more particularly to shelter structures including photovoltaic illumination systems. Most particularly, the invention relates to a photovoltaically illuminated transit shelter wherein the illumination system comprises, and is integral with, one of the walls of the structure.

BACKGROUND OF THE INVENTION

Transit shelters are a common sight in urban environments. Such shelters generally comprise partially enclosed structures designed to protect persons from heat, cold or rain while they are waiting for buses, subways or taxis. Since persons waiting in transit shelters constitute an at least temporarily captive audience, advertisement displays of various types are often placed in these shelters.

It is generally desirable to provide a source of illumination in transit shelters for purposes of increasing visibility and security during hours of darkness and for illuminating advertising displays, transit schedules or other visual information therein. While transit shelters are usually disposed in urban areas where electrical power from street light systems and the like is readily available, providing illumination to transit shelters generally entails an unjustifiable expense. This is for the reason that electrical power to street lighting systems or overhead power lines is typically supplied at a very high voltage. Accordingly, delivery of power to the shelter necessitates providing a step-down transformer as well as providing shielding and security for the transformer. The expense in both hardware and labor for bringing power to a transit shelter generally amounts to between $4,000 and $7,000 per shelter.

Illumination systems in transit shelters need not be very high in wattage, nor do they need to run 24 hours a day. Solar photovoltaic energy is an ideal source of illumination for transit shelters and such systems have been known in the prior art. In typical prior art systems, such as those sold by Photocomm, Inc. of Rancho, Calif., illumination of a bus shelter is provided by a roof-mounted solar panel connected to an interiorly disposed battery-light bulb combination. While prior art systems do provide for illumination of the shelter at night and can incidentally illuminate advertising and other display material therein in a secondary manner, they have found to be inadequate insofar as the exposed components of the lighting system are prone to theft and/or vandalism and the illumination level of the advertising displays is generally quite low and hence not visible at a distance.

There is a need for a solar photovoltaically illuminated transit shelter which provides a high degree of security for the illumination system and which also provides a high level of visibility for display material illuminated therein. These two criteria satisfy needs of both municipal governments which purchase the shelters and advertisers who rent space therein.

The present invention provides for an improved photovoltaically illuminated shelter having a totally enclosed, self-contained illumination system which is not prone to vandalism. Furthermore, the illumination system of the present invention provides a large-area, highly visible, backlit display which illuminates the interior of the shelter. These and other advantages of the present invention will be readily apparent from the drawings, discussion and description which follow.

BRIEF DESCRIPTION OF THE INVENTION

There is disclosed herein a shelter structure having a self-contained illumination system. The structure comprises a wall module consisting of a pair of panels, at least one of which is light transmissive. The panels are disposed in a spaced-apart relationship and they have closure means associated with them. The closure means and panels cooperate to define a substantially enclosed interior volume. Disposed within this interior volume is an illumination system which comprises a storage battery in electrical communication with a lamp. The wall module supports a roof and a photovoltaic generator is disposed on the roof. The generator is operative to provide an electrical current in response to the absorption of illumination thereby and this current is communicated to the storage battery.

In further embodiments, the illumination system includes a power controller which operates to sense the charge level of the batteries and control the illumination of the lamp in response thereto. The controller may also be operative to sense the level of current produced by the solar generator and hence the level of illumination incident thereupon and to control the lighting of the lamps in response thereto.

BRIEF DESCRIPTION OF THE DRAWINGS

FIG. 1 is a perspective view of one embodiment of transit shelter structured in accord with the principles of the present invention;

FIG. 2 is A front, cross-sectional view of the wall module portion of the shelter of FIG. 1;

FIG. 3 is a cross-sectional view of the wall module of FIG. 2, taken along line III—III:

FIG. 4 is a schematic view of one embodiment of electrical circuitry used in the present invention; and FIG. 5 is a cross-sectional view of a portion of a shelter structure in accord with the present invention, illustrating yet another configuration of wall module.

FIG. 6 is a cross-sectional view of a portion of a shelter structure in accord with the present invention, illustrating yet another configuration of a wall module.

DETAILED DESCRIPTION OF THE INVENTION

The present invention is directed to shelter structures, such as transit shelters, telephone booths, guard stations and the like having solar powered illumination systems integral therewith. Referring now to FIG. 1, there is shown one embodiment of shelter structure configured in accord with the principles of the present invention. The shelter 10 of FIG. 1 includes a roof 12 having a photovoltaic generator, in this instance comprised of four photovoltaic modules 14a, 14b, 14c, 14d, it being understood that a greater or lesser number of modules may be employed. The shelter further includes a wall module 16 disposed at one end thereof. The wall module 16, which will be described in greater detail hereinbelow, houses and protects the illumination circuitry for the shelter 10. As depicted, the module 16 includes indicia, in this instance an advertising display panel 18 on one face thereof.

The shelter includes a back wall 20 and a side wall 22 which, together with the wall module 16, support the roof 12. The shelter 10 further includes a bench 24 and a front support post 26. It is to be understood that this illustration generally represents a transit shelter and similar structures may be fabricated in accord with the principles of the present invention. For example, the shelter may include a front wall, doors, different seating arrangements and other such design variations. Similarly, the structure may include two or more illuminated wall modules and a larger or smaller number of photovoltaic modules.

When the shelter 10 is operational the photovoltaic modules 14 operate during daylight hours to charge an electrical storage battery disposed within the wall module 16. The battery accumulates charge and during the hours of darkness energizes a number of electrical lamps also disposed within the wall module 16. The lamps serve to backlight the advertising display panel 18 and to illuminate the interior of the shelter 10.

Referring now to FIG. 2, there is shown a cut-away front elevational view of the wall module 16 with the front advertising panel 18 removed. In accord with the principles of the present invention, the wall module 16 comprises a pair of panels, at least one of which is light transmissive and these panels are joined in a spaced-apart relationship by closure means so as to define an interior space. In FIG. 2, the rear panel is affixed to closure means such as a support bracket 30. Illustrated in FIG. 2 are a plurality of fluorescent lamps 32a, 32b, 32c disposed within the interior of the wall module 16. The lamps are mounted thereto by electrical connector clips 34 which are affixed to the support bracket 30. Also disposed within the module is a power controller 36, the function of which will be described in greater detail hereinbelow, and a number of lamp ballasts 38a, 38b, 38c, each corresponding to, and associated with, one of the lamps 32. The wall module further includes a number of electrical storage batteries 40a, 40b, 40c, 40d.

The power controller 36 is in electrical communication with the photovoltaic generator (not shown in this figure) via an electrical line 42. The controller 36, ballasts 38 and batteries 40 are also in electrical communication via electrically conductive wires 43.

Referring now to FIG. 3, there is shown a cross-sectional view of the wall module 16. Depicted therein is the manner in which the support bracket 30 maintains the front 18 and rear 28 panels in spaced-apart relationship. As illustrated, the support bracket 30 is a rigid, metallic member and the panels 18 and 28 are fastened thereto by a plurality of screws 44 so as to permit demounting of one or both of the panels for purposes of access to the interior space. It is to be understood that the shelter will be exposed to a range of atmospheric conditions hence it will be preferable to include a gasket or other sealing means between the bracket 30 and panels 18, 28 to exclude ambient moisture and dirt. Similarly, other mounting means such as rivets, adhesive, clamps and the like may be employed. Also visible in this illustration are the lamps 32a-32c one of the batteries 40d and a portion of the electrical wire 43 connecting the batteries to the lamp ballasts.

The panels 18, 28 are preferably fabricated from a durable, vandal-resistant material and at least one of the panels must be light transmissive. In most instances, it will be preferable to fabricate both of the panels from a light transmissive material. Among some of the most preferred materials for the panels are synthetic organic polymeric materials such as polycarbonates, polyvinyl acetate, polystyrene and combinations thereof. In most instances it will be desirable to make the panels out of a light diffusing, translucent material so as to disperse the illumination uniformly. One or both of the panels 18, 28 may bear indicia thereupon such as advertising material, informational material, decorative material or the like. As is well-known in the display arts, such indicia may be prepared in the form of transparencies adapted for back illumination and these transparencies may be affixed to, or may comprise, one or both of the panels 18,28. In a further refinement, one or both of the panels 18,28 may bear clips, channels or other such holders on the interior face thereof. Thus, transparencies may be readily inserted, retained and changed.

Referring now to FIG. 4, there is shown one embodiment of illumination circuitry which may be employed in the practice of the present invention. As illustrated therein, a bank of photovoltaic modules 14a-14d are employed to generate power. There are many types of photo voltaic modules presently known and commercially available and any of such may be employed in the practice of the present invention. Among such photovoltaic generators are amorphous, silicon cells, crystalline silicon cells, polycrystalline silicon cells, cadmium sulfide cells and gallium arsenide cells. One particular module having utility in the present invention is an amorphous silicon module of the type manufactured by Sovonics Solar Systems of Troy, Mich. and sold under the designation of R-100. These are 37 watt panels and are available through B & E Energy Systems Inc. of Bloomfield Hills, Mich.

The photo voltaic modules 14a-14d are electrically interconnected in parallel to a power controller 46, each through a blocking diode 48a-48d. These diodes, as is well known to those of skill in the art, are employed to prevent any backflow of current through a cell, from either a cell interconnected thereto which might be generating a higher level of power or from the batteries.

The system further includes a bank of storage batteries 40a-40d for purposes of accumulating and storing electrical power during daylight hours. These cells may comprise any well known storage cells such as lead-acid cells, nickel-cadmium cells, sodium-sulfur cells and the like. One particular type of cell having utility in the present invention is a 45 amp. lead-acid gel cell of the type sold by the Sunshine Solar Corp. of Miami, Fla. under the name SunCharge.

The illumination system further includes three twelve-volt, 40 watt fluorescent lamps 32a, 32b, 32c. Each lamp has a ballast 38a, 38b, 38c in electrical association therewith. These ballasts are, in this embodiment, those of the type known as inverter ballasts and operate to convert a DC input to an alternating current output for energization of the fluorescent lamps. Such ballasts are well known to those of skill in the electronic arts and one particular type of ballast having utility in the present invention is available from Sunshine Solar Inc. of Miami, Fla. under the designation SunLite Ballast.

The power controller 36 is a device which operates to selectively switch power from the photovoltaic cells 14 to the batteries 40 and to the lamps 32 in response to changing conditions. The controller 46 is typically a relay based voltage-regulator and such devices are well known to those of skill in the art. One particular power controller having utility in the present invention is available from Sunshine Solar Inc. of Miami, Fla. under the designation SunSelector PLC-1. This particular controller is operative to sense the level of voltage in the bank of storage cells 40a and the level of power being produced by the photovoltaic modules 14 and to control the charging of the cells in response thereto. By appropriately monitoring the voltage of the cells 40, overcharging is prevented. The power controller 46 is further operative to connect the storage cells 40 to the ballasts 38, and hence the lamps 32, when the level of outside illumination, as measured by the output of the photo voltaic modules, (or a separate photosensor) falls below a desired level. Presence of the blocking diodes 48 prevents backflow of electrical current from the cells to the photo voltaic modules 14.

The controller 46 may be further operative to control the level of illumination of the lamps 32 in response to the amount of charge stored in the batteries 40. In such instance, the controller 46 measures the voltage level of the batteries and if the voltage falls below a preselected level either extinguishes one or more of the lamps or reduces the current supplied to all of the lamps. This feature conserves battery power during periods of time when insulation is low and hence battery recharging is not complete.

The foregoing described circuitry is capable of providing up to three nights of illumination from a single day's battery charging. By increasing the number of photovoltaic modules and the number of storage cells, the duration and/or intensity of illumination may be increased. Clearly, many variations of the foregoing circuitry will be readily apparent to one of skill in the art in light of the teaching herein. For example, the power controller may be eliminated by selecting the photovoltaic generator to provide a maximum voltage equal to a safe charging voltage for the cells, thus damage from overcharging will be prevented. Illumination of the lamps may then be controlled by a timer, photoconductive switch or similar device.

Many variations of transit shelter may be structured in accord with the principles of the present invention. For example, FIG. 5 illustrates yet another configuration of wall module 16'. The wall module 16' of FIG. 5 is generally similar to that shown in FIGS. 2 and 3 except that the two panels 18 and 28' are of somewhat different heights. The interior panel 28 extends the full height of the transit shelter and provides support for the roof 12 thereof. The first panel 18 is somewhat smaller than the second 28'. As in the foregoing example, the panels 18, 28' are joined by a connector bracket 30 associated therewith. The bracket 30 and panels 18, 28' define an interior volume which encloses the lamps 32 and battery 40.

Yet other variations of shelter may be structured in accord with the principles of the present invention. For example, the use of a bracket is not always required. One or both of the panels may be bent so as to join the two together and maintain them in spaced-apart relationship. One such embodiment is shown in FIG. 6 wherein a bent front panel 50, engages a rear panel 52 to define a wall module 54.

In yet other variations of the present invention, the wall module may be fabricated as a curved member having curved plates in spaced-apart relationship. For example, a relatively small shelter such as a phone booth, guard station or the like may be fabricated by supporting a roof atop a single curved wall module. In yet other variations of the present invention, a shelter may be fabricated from several discrete wall modules. The present invention may also be adapted to fabricate larger illuminated structures such as dwellings, shops and the like.

In view of the foregoing, it should be clear that many variations of the shelter structure are contemplated within the scope of the present invention. The foregoing drawings, discussion and description are merely meant to be illustrative of particular embodiments thereof and are not meant to be limitations upon the practice of the invention. It is the following claims, including all equivalents, which define the scope of the invention.

I claim:

1. A shelter structure of the type comprising a plurality of walls having a roof supported thereby, said structure having a self-contained illumination system, said structure comprising:
    a first wall configured as a module comprising a pair of panels, at least one of which is light transmissive, maintained in a spaced apart, generally plane-parallel relationship by closure means so as to define a substantially enclosed interior volume;
    an electrical storage battery disposed in said interior volume;
    a plurality of fluorescent lamps disposed in said interior volume;
    a plurality of lamp ballasts each disposed in said interior volume each ballast in electrical communication with one of said fluorescent lamps and with said battery;
    a roof supported by said wall module;
    a photovoltaic generator disposed on said roof and in electrical communication with the battery; and
    a power controller in electrical communications with the photovoltaic generator, the lamps and the battery, said controller disposed in said interior volume and operative to sense the level of charge of the battery and the level of power being produced by the photovoltaic generator and to control the charging of the battery and the illumination of the lamps in response thereto.

2. A shelter as in claim 1, wherein said at least one light-transmissive panel is fabricated from a synthetic organic polymer.

3. A shelter structure as in claim 1, wherein said at least one light-transmissive panel bears indicia thereupon.

4. A shelter structure as in claim 1, wherein said pair of panels are both light-transmissive panels.

5. A shelter structure as in claim 1, wherein said closure means comprises a bracket.

6. A shelter structure as in claim 1, wherein said closure means is provided by an extended portion of at least one of said panels.

7. A shelter structure as in claim 1, wherein said photo voltaic generator comprises an amorphous silicon photovoltaic device.

* * * * *